United States Patent
Acheson et al.

(10) Patent No.: US 10,338,972 B1
(45) Date of Patent: Jul. 2, 2019

(54) PREFIX BASED PARTITIONED DATA STORAGE

(71) Applicant: Amazon Technologies, Inc., Seattle, WA (US)

(72) Inventors: Alazel Acheson, Redmond, WA (US); Meng Hu, Jiangsu (CN); Nauman Zubaid Khan, Redmond, WA (US); Mai-Lan Tomsen Bukovec, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 733 days.

(21) Appl. No.: 14/289,353

(22) Filed: May 28, 2014

(51) Int. Cl.
*G06F 9/50* (2006.01)
*G06N 7/00* (2006.01)

(52) U.S. Cl.
CPC .......... *G06F 9/5077* (2013.01); *G06N 7/005* (2013.01)

(58) Field of Classification Search
None
See application file for complete search history.

(56) References Cited

U.S. PATENT DOCUMENTS

| | | | | |
|---|---|---|---|---|
| 6,094,706 A * | 7/2000 | Factor | ................ | G06F 12/0875 707/999.006 |
| 6,105,065 A * | 8/2000 | Rao | ..................... | H04L 41/0213 709/205 |
| 7,313,666 B1 * | 12/2007 | Saminda De Silva | ...................... | H04L 45/7453 709/238 |
| 7,647,329 B1 * | 1/2010 | Fischman | .......... | G06F 17/30094 707/999.1 |
| 2006/0190924 A1 * | 8/2006 | Bruening | ............ | G06F 12/0875 717/104 |
| 2009/0178037 A1 * | 7/2009 | Winter | .................. | G06F 9/5077 718/1 |
| 2011/0072006 A1 * | 3/2011 | Yu | ..................... | G06F 17/30451 707/718 |
| 2013/0013725 A1 * | 1/2013 | Scheevel | ........... | G06F 17/30902 709/213 |

(Continued)

OTHER PUBLICATIONS

Mao et al, Cache Craftiness for Fast Multicore Key-Value Storage, 2008.*

(Continued)

*Primary Examiner* — Li B. Zhen
*Assistant Examiner* — Mikayla Chubb
(74) *Attorney, Agent, or Firm* — Davis Wright Tremaine LLP

(57) ABSTRACT

A computing resource service provider may store user data in a distributed data storage system. The distributed data storage system may contain one or more storage partitions configured to store based at least in part on prefixes of keys contained in a key-value store, where the size of the keys may vary. The one or more storage partitions may track requests to access data where the requests include a key such that the data may be located by the service provider based at least in part on the key. When a request is received a counter associated with the prefix included in the request may be incremented, the counter may be configured to decay over time. If the counter exceeds a threshold the service provider may split the prefix associated with the counter and generate new partitions responsible for the split prefix.

20 Claims, 9 Drawing Sheets

(56) References Cited

U.S. PATENT DOCUMENTS

| | | | | |
|---|---|---|---|---|
| 2013/0212296 A1* | 8/2013 | Goel | ................. | H04L 45/7453 709/238 |
| 2013/0246651 A1* | 9/2013 | Keen | ................. | H04L 45/7453 709/238 |
| 2014/0059333 A1* | 2/2014 | Dixon | ................. | G06F 9/3004 712/244 |
| 2016/0103710 A1* | 4/2016 | Shachar | ................. | H04L 49/00 718/102 |

OTHER PUBLICATIONS

Jouppi, Improving Direct-Mapped Cache Performance by the Addition of a Small Fully-Associative Cache and Prefetch Buffers, 1990.*

Phoophakdee et al, Genome-scale Disk-based Suffix Tree Indexing, 2007.*

Kim et al, Fair Cache Sharing and Partitioning in a Chip Multiprocessor Architecture, 2004.*

Krishnamurthy et al, On Network-Aware Clustering of Web Clients, 2000.*

Zhang, Yin, et al., "Online Identification of Hierarchical Heavy Hitters", Internet Measurement Conference (2004).

Cormode, Graham, et al., "Finding Hierarchical Heavy Hitters in Data Streams", Proceedings of the 29th VLDB Conference, Berlin, Germany (2003).

* cited by examiner

PREFIX BASED PARTITIONED DATA STORAGE

BACKGROUND

The use of network computing and storage has proliferated in recent years. The resources for network computing and storage are often provided by computing resource providers who leverage large-scale networks of computers, servers and storage drives to enable clients, including content providers, online merchants and the like, to host and execute a variety of applications and web services. Content providers and online merchants, who traditionally used on-site servers and storage equipment to host their websites and store and stream content to their customers, often forego on-site hosting and storage and turn to using the resources of the computing resource providers. The usage of network computing allows content providers and online merchants, among others, to efficiently and adaptively satisfy their computing needs, whereby the computing and storage resources used by the content providers and online merchants are added or removed from a large pool provided by a computing resource provider as needed and depending on their needs. The computing resource service providers may respond to requests for computing and storage reactively by adding or removing resources assigned to the content providers, online merchants and others.

BRIEF DESCRIPTION OF THE DRAWINGS

Various embodiments in accordance with the present disclosure will be described with reference to the drawings, in which.

DETAILED DESCRIPTION

Figure 1A:
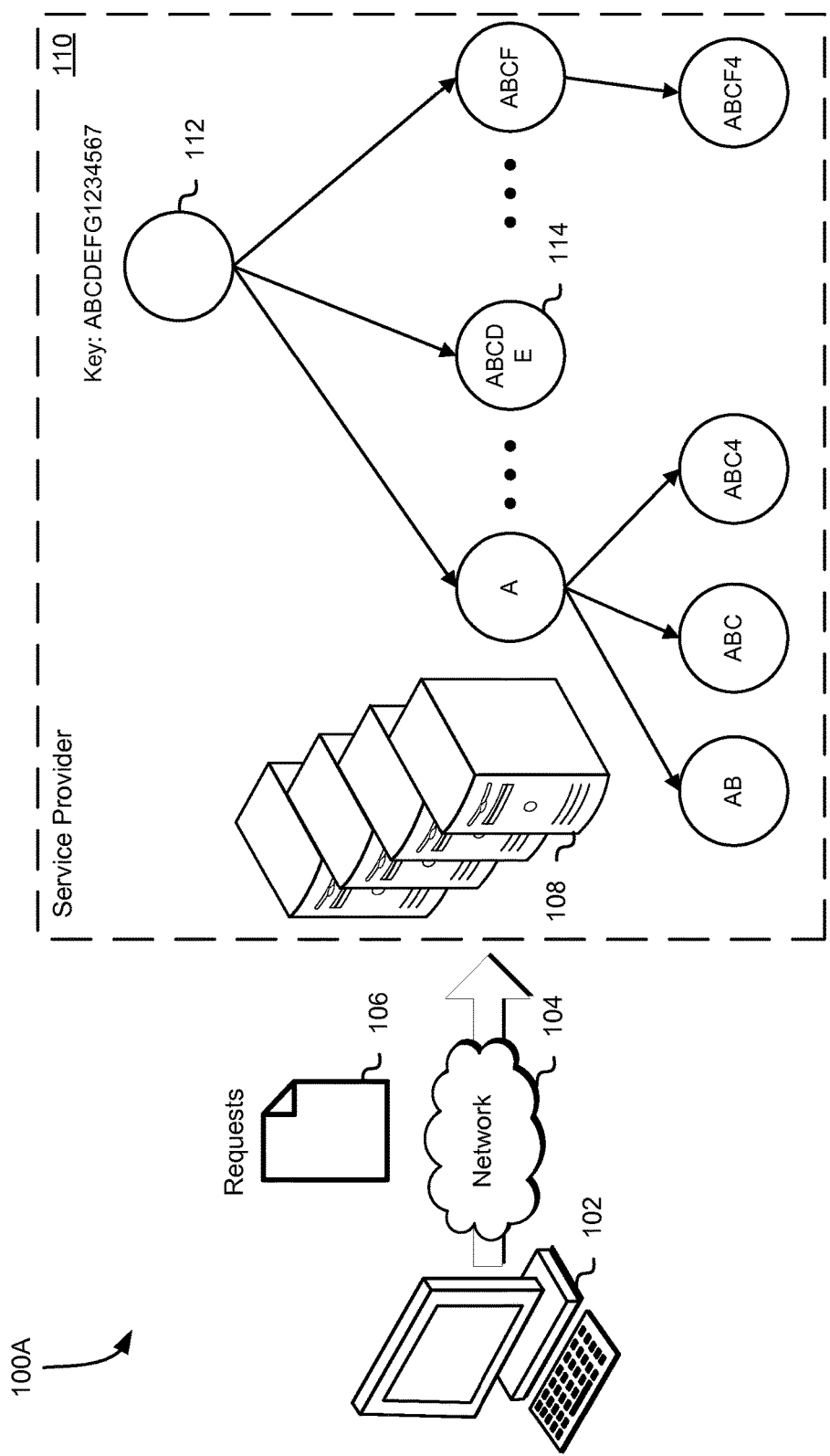
FIGS. 1A and 1B are an environment illustrating partitioning data storage based on key prefixes in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein relate to improvements to data storage systems including partitioning data storage nodes based at least in part on request activity. Organizations and individuals may use computing resources of a computing resource service provider (also referred to as a service provider) in order to store data remotely. The organizations and individuals may interact with the data stored remotely, by the service provider, through appropriately configured requests such as application programming interface (API) calls configured with information identifying the data to be interacted with.

The service provider may track requests in order to determine activity associated with data stored remotely by the service provider and adjust computing resources assigned to the data according to activity. The service provider may operate a data storage service responsible for storing data on behalf of customers of the service provider. The data storage service may use keys to locate and store data on behalf of the customer. For example, the data storage service may concatenate a key of a uniform resource locator (URL) associated with the data with a user generated key, such as a location name, in order to track the location of the data. The key or a portion of the key may then be associated with a particular storage partition where the data is stored. The storage partition (also referred to simply as partitions) may contain one or more data stores configured to store customer data and track requests to interact with data stored within the partition. The requests to interact with data may include a key indicating the location of the data within the data storage service, such as a particular partition of the data storage service. A request-processing subsystem may be responsible for receiving customer requests and determining the particular partition associated with the request.

The partitions may be responsible for tracking requests based at least in part on the key included in the request. The requests may be tracked based at least in part on a prefix of the keys. If the partition receives a certain number of requests containing a particular prefix over an interval, the data storage service may determine to split the prefix and generate a new partition responsible for processing requests associated with the split prefix. The data storage service may split the prefix by increasing the prefix length to include an additional element from the key space. For example, the user may define a particular key "ABCD1234" by including the key in a request to store data. The data storage service may then cause the data to be stored in a particular partition and update a key-value store maintained by the request-processing system to indicate the location of the data associated with the key. When a subsequent request to access the data is received, the request may include the key "ABCD1234" and an indication of an operation to be performed. The request-processing system may then direct the request to the partition indicated in the key-value store. The partition may then track prefixes associated with keys included in the request. For example, a prefix of the key "ABCD1234" may include "AB" or "ABC," which then may be tracked by the partition to determine the frequency the particular prefix is included in requests.

If the frequency of a particular prefix exceeds a threshold the data storage service may split the prefix by generating a new prefix. For example, if the counter associated with a prefix exceeds the threshold the data storage service may determine to split the prefix and distribute the load to additional partitions. The partition may determine one or more split points based at least in part on the counter associated with each prefix and the amount of data associated with each prefix. Returning to the example above, the partition may determine a potential split point of "ABC." The data storage service may then generate a new partition and direct requests including the "ABC" prefix to the new partition. For example, the key "ABCDE234" may be directed to the new partition, where the key "AAAA314" may be directed to the previous partition associated with the key "ABCD1234". Each partition may individually track prefixes in order to determine request rates associated with the tract prefixes and potential split points within the prefixes. Furthermore, the partitions may track a specific number of prefixes. For example, the partitions may track the 10,000 most active prefixes.

The partitions may maintain a collection of prefixes and maintain or otherwise have an associated counter indicating the number of requests associated with each prefix. Furthermore, the partitions may maintain the prefixes such that the counter associated with the prefix is configured to decay over time. For example, the counter may be subject to exponential decay so that the counter decreases at a rate proportional to the counter's current value. The prefix counter may be maintained such that a previous value of the prefix counter has an effect on updating and/or incrementing the prefix counter. As described above, the prefix counter may be configured to decrease as a result of a passage of time between updating and/or incrementing the previous value of the prefix counter, the measure of the decrease may be calculated when the prefix counter is to be incremented and then used to update the prefix counter. In various embodiments, the collection of prefixes may be an ordered list of prefixes, the list may be ordered based at least in part on the counter associated with each prefix such that the prefixes associated with the most requests are maintained higher in the list. Prefixes that are included less frequently in requests may eventually decay and be removed from the list. The removed prefixes may be replaced by other prefixes which are included in requests more frequently. The partitions may include a tracking service configured to determine prefixes associated with the most number of requests and potential split points among the prefixes. A particular partition or a set of partitions may receive a request including a prefix, the request tracking service may then increment the counter associated and the partitions may respond to the request.

The data storage service may determine a threshold value indicating the counter value at which a particular prefix may be hit. For example, the collection of prefixes maintained by the tracking service may indicate the frequency of requests received for a particular prefix, the data storage service may determine the threshold value such that the frequency of requests received for the particular prefix does not exceed 200 requests per second. The data storage service or component of the data storage service may monitor the tracking service to determine if the counter value associated with prefixes tracked by the tracking service exceeds the threshold value. In some embodiments, the data storage service maintains an average of the number of requests per partition, if the average for a particular partition is above a certain number the data storage service may obtain from the tracking service associated with the partition one or more split points for the prefix associated with the partition.

Once the data storage service has determined to split a particular prefix, the data storage service may provision one or more new storage partitions. A repair service may then copy data from the partition associated with the prefix to the one or more new partitions. In various embodiments, the repair service may determine the most recent data to copy to the one or more new partitions based at least in part on a timestamp associated with the data. Furthermore, the repair service may asynchronously write data to the one or more new partitions while the partition associated with the prefix continues to process requests. Once the repair service has completed writing data to the one or more new partitions, the data storage service may increment prefix length and begin directing traffic to the one or more new partitions based at least in part on the incremented prefix. For example, the data storage service may determine that the partition associated with the prefix "ABC" is receiving requests at a particular frequency over the threshold based at least in part on information received from the tracking service associated with the partition responsible for processing requests containing the "ABC" prefix. The data storage service may then provision a new partition and cause the repair service to copy data from the partition responsible for the "ABC" prefix to the new partition. The data storage service may then add an additional element to the prefix such that the new prefix associated with the new partition is "ABCD."

Partitions may be responsible for multiple prefixes. For example, a partition may contain data associated with prefixes "ABC" and "DEF." The request received from the customers may include requests to read or write data stored by the data storage service. The customers of the service provider may define the key used for storing the customers' data. The tracking service may then determine which prefixes associated with the key are being received more often than the other prefixes and enable the data storage service to take mitigating actions, such as increasing the amount of computing resources configured to process the requests. The tracking service may determine the frequency of the requests in the key space using a modified hierarchical heavy hitters algorithm as described above. The modified algorithm may allow for the tracking of a fixed number of prefixes in the key space and the decay of tracked prefixes over an interval. By maintaining a fixed number of track prefixes the data storage service may limit the amount of memory and other computing resources utilized to track the prefixes. For example, the partitions may track the prefixes in memory of the computer system executing the partition and by limiting the number of prefixes that may be tracked the data storage service may place an upper bound on the amount of resources required to track prefixes. Furthermore, the data storage service may be configured to direct requests to the partition responsible for the longest prefix that matches the key. For example, a request including the key "ABCD1234" may be directed to the partition associated with prefix "ABCD1" rather than the partition associated with the prefix "A" because the prefix "ABCD1" is the longer prefix that still matches the key.

Figure 1B:
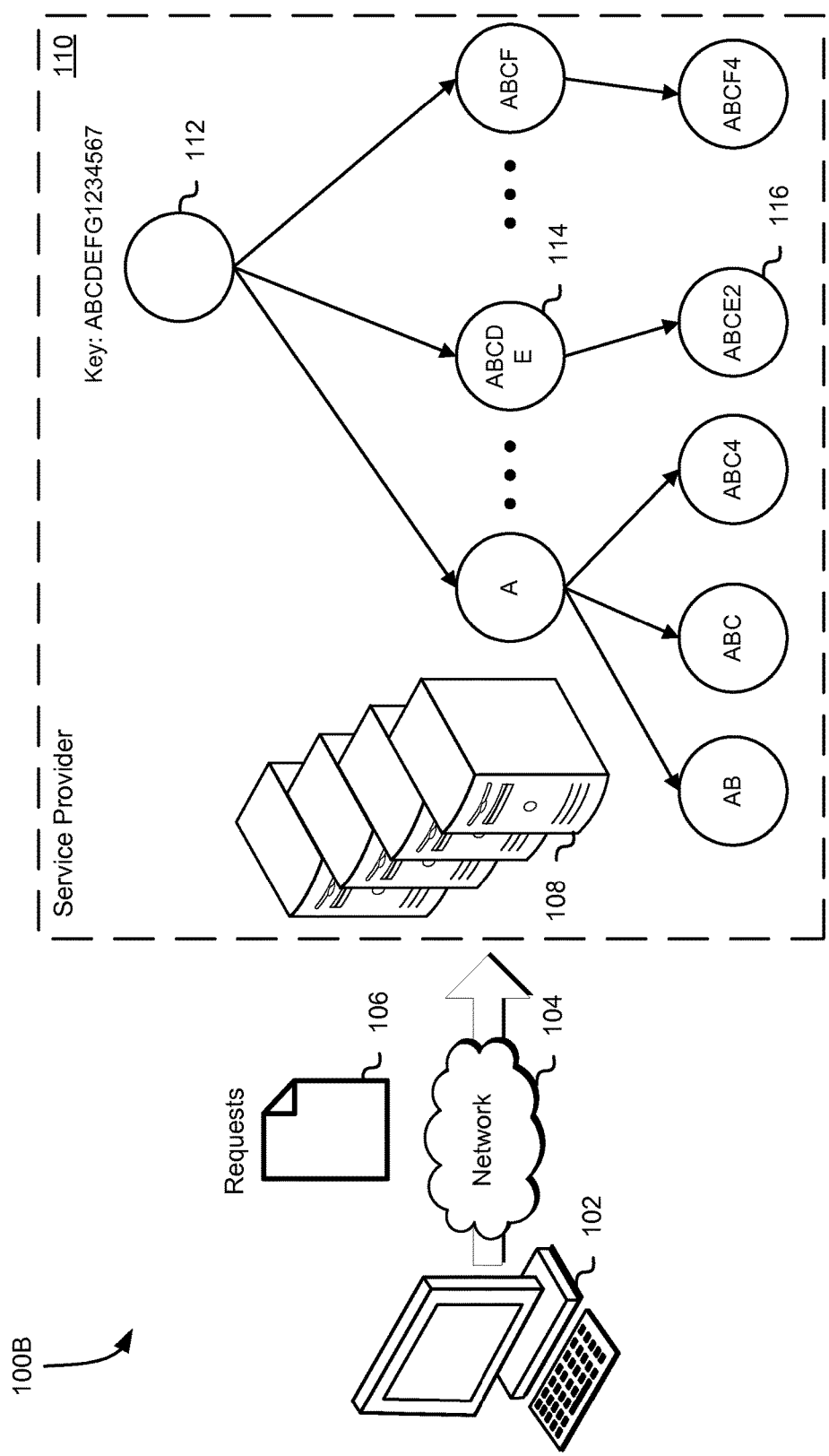

FIGS. 1A and 1B illustrate an example environment 100A and 100B where one or more computer systems running within a computing resource service provider environment, as well as the associated code running thereon, may operate a remote data storage service configured to store data in a storage partition and fulfill requests to interact with stored data based at least in part on a key (also referred to as an identifier) included in the request where a prefix of the key is associated with a particular storage partition containing the requested data. Although the term prefix is used throughout for illustrative purposes, any subsequence of an identifier including at least a subset of the bits and/or characters of the identifier may be used in accordance with the present disclosure. For example, a suffix of the key may be used to track requests and determine potential split point. Furthermore, any deterministic algorithm may be used for generating an identifier including at least a subset of the bit of the key. The identifiers of the data objects may be sequences and various subsequences of the identifiers may be tracked such as prefixes, suffixes, subsequences starting after the nth character or bit or subsequences starting n characters or bits from the end of the identifier. A user 102 may connect to a data storage server 108 through a computer system client device and may initiate connection with and/or interaction with one or more storage partitions associated with the data storage server 108. For example, the user may submit a request 106 to interact with data stored in the data storage partition associated with the data storage server 108 operated by the service provider 110. The request 106 may be any request to interact with data stored by the service provider, such as an API call, service call, a hypertext transfer protocol (HTTP) request or similar request capable of enabling interaction with data stored remotely. The interaction may include a variety of interactions such as writing data to storage, reading data from storage, modifying data stored remotely or any other interaction performable on data stored by the service provider 110.

The user 102 may include organizations or entities of an organization. The term organization, unless otherwise clear from context, is intended to be read in the broad sense to imply a set of principals organized in some manner. The user 102 may submit the request 106 through an interface such as a management console executed by the service provider 110 and provided to the user 102 as a website. The data storage server and one or more storage partitions each associated with a particular prefix of the key space 112 may be operating within a service provider 110. In some embodiments, the computing resource service provider 110 may provide a distributed, virtualized and/or datacenter environment within which one or more applications, processes, services, virtual machines and/or other such computer system entities may be executed. The data storage server 108 may be a computer system configured to store information on behalf of the user 102 and enable the user to interact with the data stored through appropriately configured requests 106. For example, the data storage server 108 may be a computer server located in a data center including one or more attached storage devices, such as a hard disk drive.

The user 102 may submit requests 106 over a connection, the connection may be established over a network 104. The network 104 may be any suitable network such as the Internet, a local area network, wide area network or any other suitable communications network and/or other networks noted herein and/or combinations of networks. The requests 106 may be received by the data storage server 108 or interface of the data storage server directly or may be forwarded to the data storage server 108 by one or more services or servers of the service provider. For example, the request 106 may be received by a request-processing subsystem, described in greater detail below in connection with FIG. 3, operated by the service provider 110 and forwarded to one or more data storage servers 108. The request-processing subsystem may determine one or more data storage servers 108 capable of fulfilling the request 106 and forwarding the request 106, based at least in part on the determination.

Once the request 106 has been received at the data storage server 108, the data storage server 108 may determine the storage partition responsible for maintaining the requested data on behalf of the user 102. The data storage server 108 may determine the storage partition responsible for maintaining the requested data based at least in part on a prefix of a key included in the request. As described above, the customer may define the key and include the key in the request to enable the location of the requested data. For example, the key may include a URL of the requested data concatenated with a file name assigned to the data by the user. Furthermore, the key may include a representation of information configured to locate the data such as a hash. As illustrated in FIG. 1, the key space 112 may be represented in a tree structure with each node representing a prefix and associated storage partition. For example, the key space 112 "ABCDEFG1234567" represented in FIG. 1 contains the prefix "ABC." A data storage service operated by the service provider 110 may provision a storage partition on the data storage server 108 responsible for storing data associated with the prefix "ABC."

As illustrated in FIG. 1B, the prefix "ABCD" 114 may be associated with a particular partition, the particular partition may receive a certain number of requests including the prefix "ABCDE2" 116 over an interval such that the counter associated with the prefix "ABCDE2" exceeds the threshold. The data storage service may then generate a new partition and associate the new partition with the prefix "ABCDE2" 116, for example, by updating the key-value store maintained by the request-processing system to include a record indicating that data associated with the prefix "ABCDE2" 116 is located in the new partition. The repair service may then copy data associated with the "ABCDE2" 116 prefix from the particular partition to the new partition. The data storage service may then cause requests including the prefix "ABCDE2" 116 to be directed to the new partition.

Figure 2:
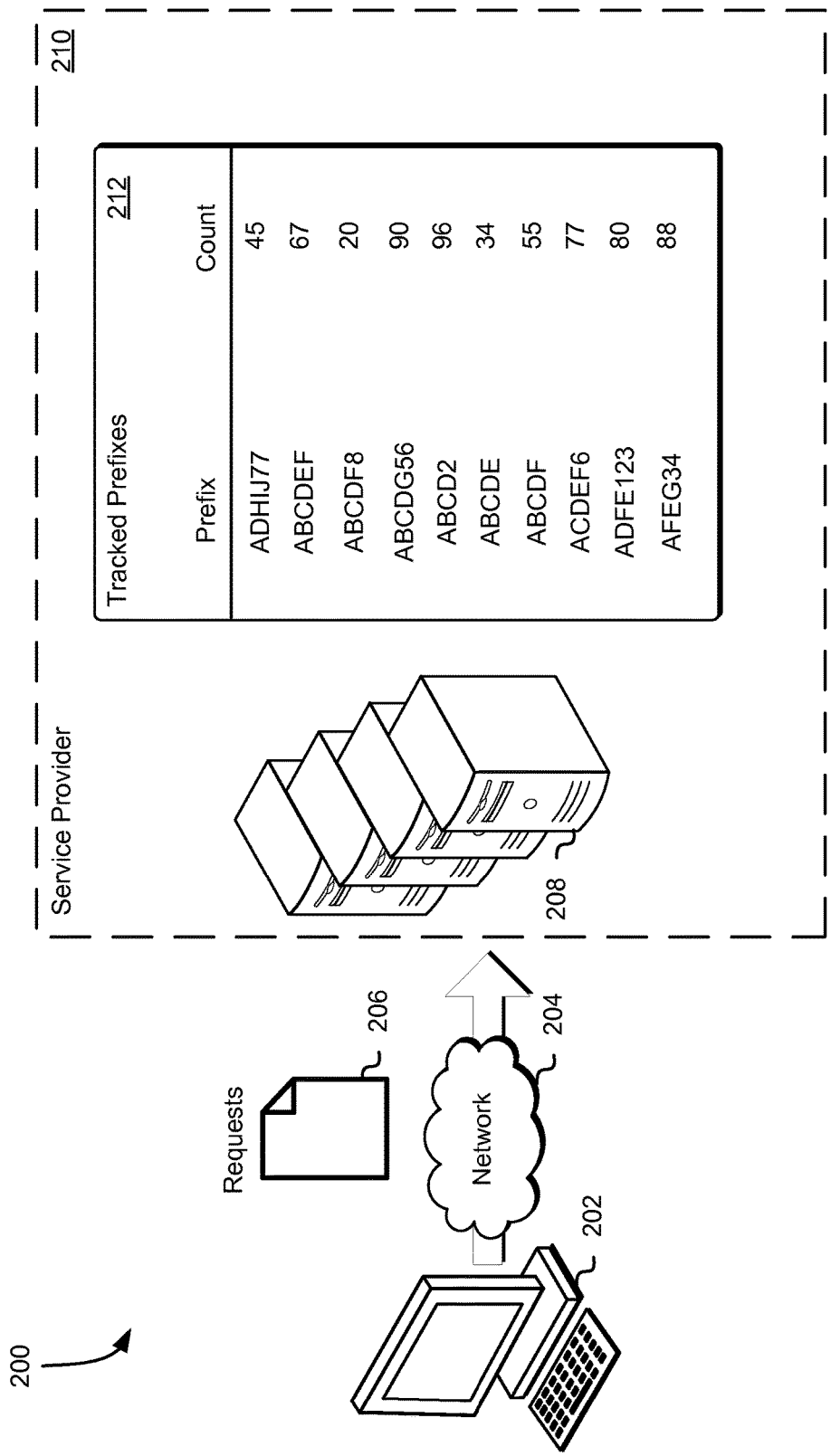
FIG. 2 is an environment illustrating tracking key prefixes in accordance with at least one embodiment.

FIG. 2 illustrates an example environment 200 where one or more computer systems running within a computing resource service provider environment, as well as the associated code running thereon, may operate to track keys included in requests in order to determine one or more split points for new storage partitions. A user 202 may connect to a data storage server 208 through a computer system client device and may initiate a connection with and/or interaction with one or more storage partitions associated with the data storage server 208. For example, the user may submit a request 206 to interact with data stored in the data storage partition associated with the data storage server 208 operated by the service provider 210. The request 206 may be a request to read data stored in a particular partition, identified by the prefix of the key included in the request, of the data storage server 208. For example, the request may be a request to download a particular file identified by the directory and file name of the file. The request-processing subsystem may then determine a particular data storage server 208 containing the file and forward the request to the particular data storage server 208. The particular data storage server 208 may fulfill the request from the storage partition containing the requested data. In various embodiments, the data storage server 208 executes a plurality of storage partitions with at least some of the partitions operating on a quorum basis such that a minimum number of storage partitions must fulfill the request in order for the partitions to be considered authoritative. For example, the data storage server 208 may provision five partitions responsible for the same prefix and containing the same data. As requests are processed by the data storage server 208 the data may be requested from the five partitions, at least some of the five partitions may respond to the request, if three of the five partitions have responded to both a read and a write request then there is at least one partition that is authoritative.

The user 202 may submit the request 206 through an application executed by the client computing device such as a client application configured to communicate with the service provider 210 over the network 204. The data storage server and/or the one or more storage partitions may be responsible for tracking prefixes included in the request 206 and determining potential split points in the key space. The prefixes may be tracked using a modified hierarchical heavy hitters algorithm or similar algorithm configured to determine what areas in a stream of data may be the most active. In some embodiments, for each prefix included in a received request a count for the prefix may be incremented by one. Furthermore, the count may be configured to decay over time at a particular rate. For example, the count may be configured such that if no new requests are received with the particular prefix associated with the count, the count may decay to zero after thirty minutes.

The user 202 may submit request 206 over a connection, the connection may be established over a network 204. The network 204 may be any suitable network such as the Internet, a local area network, wide area network or any other suitable communications network and/or other networks noted herein and/or combinations of networks. The request 206 may be received by the data storage server 208, an interface of the data storage server 208 directly or may be forwarded to the data storage server 208 by one or more services or servers of the service provider. For example, the request 206 may be received by the request-processing subsystem, described in greater detail below in connection with FIG. 3, operated by the service provider 210 and forwarded to one or more data storage servers 208.

The service provider 210 further includes a data storage service described in greater detail below in connection with FIG. 3. The data storage service may be a collection of computing resources configured to process requests 206 to store and/or access data. The data storage service may operate using computing resources (e.g., databases) and data storage servers 208 that enable the data storage service to locate and retrieve data quickly based at least in part on a prefix included in the request 206, so as to allow data to be provided in responses to requests 206 for the data. For example, the storage service may maintain stored data in a manner such that, when a request 206 for a data object is retrieved, the data object can be provided (or streaming of the data object can be initiated) in a response to the request 206. As noted, data stored in the on-demand data storage service may be organized into data objects. The data objects may have arbitrary sizes except, perhaps, for certain constraints on size, such as constraints limiting the data objects to a maximum size. Thus, the data storage service may store numerous data objects of varying sizes.

The data storage service may operate as a key value store that associates data objects with identifiers of the data objects which may be used by the user 202 to retrieve or perform other operations in connection with the data objects stored by the data storage service. The frequency of interaction with a particular data object may be tracked, as illustrated in FIG. 2, in order to determine storage partitions receiving the greatest number of requests and predicting potential split points that may reduce the load on the storage partitions receiving the greatest number of requests. Various techniques, such as machine learning, may be used to predict based at least in part on the collection of tracked prefixes which prefixes will receive the greatest number of requests in the future. In various embodiments, the partitions maintain an ordered list of tracked prefixes and potential split points in the key space. The split points may be determined based on a variety of different factors including the number of requests 206 received, the frequency of requests 206, the predicted request 206 activity, the size of the data associated with a particular prefix or other factors suitable for distributing load in a distributed computing environment.

Figure 3:
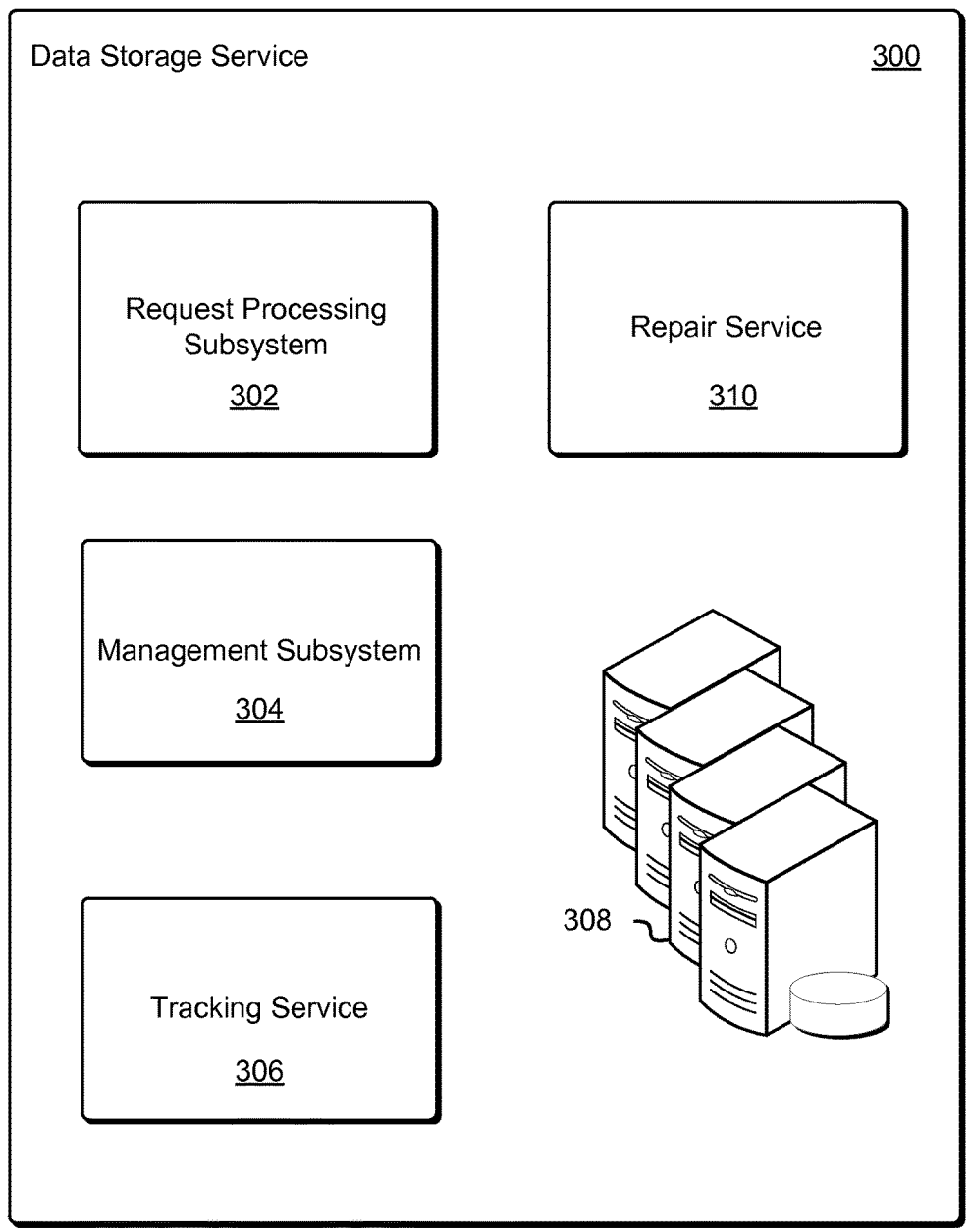
FIG. 3 is a diagram illustrating a data storage service in accordance with at least one embodiment.

FIG. 3 shows an illustrative example of a data storage service 300 in accordance with various embodiments. The data storage service 300 may be a service of a computing resource provider (also referred to simply as a service provider) used to operate a data storage service wherein user requests may be tracked in order to determine distribution of the requests among various resources of the service provider. As illustrated in FIG. 3, the data storage service 300 includes various subsystems such as a request-processing subsystem 302, a management subsystem 304, a tracking service 306 and a repair service 310. The data storage service 300 may also include a plurality of data storage servers 308. In an embodiment, the request-processing subsystem 302 is a collection of computing resources, such as webservers and application servers, collectively configured to process requests submitted to the data storage service 300. The request-processing subsystem 302, for example, may include one or more webservers that provide a web service interface to enable customers of the data storage service 300 to submit requests to be processed by the data storage service 300. Furthermore, the request-processing subsystem 302 may receive requests to interact with data stored by the one or more data storage service 306. The request-processing subsystem 302 may include computer systems configured to make various determinations in connection with the processing of requests, such as whether policy allows fulfillment of a request, whether requests are authentic (e.g., electronically signed using a suitable cryptographic key) and otherwise.

Components of the request-processing subsystem may interact with other components of the data storage service 300 (e.g., through network communications). For example, some requests submitted to the request-processing subsystem 302 may involve the management of computing resources which may include data objects stored by the data storage servers 306. The request-processing subsystem 302, for example, may receive and process requests to modify computing resources. For instance, in some examples, data objects are logically organized into logical volumes (also referred to as logical data containers). Data objects associated with a logical data container may, for example, may be said to be in the logical data container. Requests to the data processing subsystem 302 may include requests for creating logical data containers, deleting logical data containers, providing an inventory of a logical data container, providing or updating access control policy with respect to one or more logical data containers and the like.

The requests may be processed by the management subsystem 304 upon receipt by the request-processing subsystem 302. If applicable, various requests processed by the request-processing subsystem 302 and/or management subsystem 304 may result in the management subsystem 304 updating metadata associated with data objects and logical data containers stored in a metadata store. Other requests that may be processed by the request-processing subsystem 302 include requests to perform operations in connection with data objects. The requests, for example, may include requests to upload data objects to the data storage service 300, to download data objects from the data storage service 300, to delete data objects stored by the data storage service 300 and/or other operations that may be performed. The management subsystem may maintain information corresponding to the requests such as an average of the number of requests received over an interval associated with each data storage server, logical data container or storage partition.

Requests processed by the request-processing subsystem 302 that involve operations on data objects (upload, download, delete, e.g.) may include interaction between the request-processing subsystem 302 and one or more data storage servers 308. The data storage servers 308 may be computer systems communicatively coupled with one or more storage devices for the persistent storage of data objects. For example, in order to process a request to upload a data object, the request-processing subsystem may transmit data to a data storage server 306 for persistent storage. It is noted, however, that in some embodiments, client (e.g., customer) computer systems may transmit data directly to the data storage servers 306 instead of through servers in the request-processing subsystem.

In some embodiments, the request-processing subsystem 302 transmits data to multiple data storage servers 308 for the purpose of redundantly storing the data to allow the retrievability of data in the event of failure of an individual data storage server 306 and/or associated data storage device. For example, in some embodiments, the request-processing subsystem uses a redundancy in coding scheme such as erasure coding to deconstruct a data object into multiple parts that are stored among the data storage servers 308. The parts may be configured such that if access to a certain number of parts is lost, the data object may nevertheless be reconstructable from the remaining parts that remain accessible. Similarly, the data storage servers 306 may store the data in multiple partitions for the purpose of redundantly storing the data and improving the ability of the data storage service 300 to respond to requests. For example, the data storage server 306 may store a data object in multiple partitions each capable of fulfilling a request.

To enable efficient transfer of data between the request-processing subsystem 302 and the data storage servers 308 and/or generally to enable quick processing of requests, the request-processing subsystem 302 may include one or more databases that enable the location of data among the data storage servers 308. For example, the request-processing subsystem 302 may operate a key value store that serves to associate identifiers of data objects with locations among the data storage servers 308 for accessing data of the data objects. In an embodiment, the key value store uses prefixes of the keys included in the request to associated identifiers of data objects with locations among the data storage servers 308. Furthermore, the tracking service 306 may track or otherwise monitor requests to determine and/or predict distributed load between the data storage servers 308 and components thereof such as the storage partitions.

The tracking service 306 may be computer systems configured to obtain request information from the request-processing system and track a number of prefixes that are more frequently included in requests than other prefixes. For example, the tracking service 306 may be a virtual computing system executing on computing resources of the service provided and connected to the various other components of the data storage service 300 over a network. The tracking service 306 may be a process or thread of another component of the data storage service 300. For example, the tracking service 306 may be a process of the storage partitions executed by the data storage servers 308. Furthermore, the tracking service 306 may be configured to track prefixes of keys in an arbitrary name space (also referred to as a key space). The user may be able to track data to the data storage service and specify a name for the data of any size, within the maximum size constraints, if any, enforced by the data storage service. Furthermore, the size of the key may vary between keys. For example, the user may define a directory and file name for data stored by the data storage service. The same directory may contain multiple files with varying file name lengths. The tracking service 306 may also track and/or determine potential split points and enable the management subsystem 304 to determine which prefixes to associate with new storage partitions that may be created to reduce loads on existing partitions and process requests.

The repair service 310 may be responsible for maintaining data stored in the data storage server 308 and ensuring that the storage partitions executed by the data storage service 308 contain the same data. The repair service 310 may also transfer or copy data from a particular partition responsible for data associated with a prefix that is being split to a new partition responsible for data associated with the new split prefix. For example, the management subsystem 304 may determine to split a prefix based at least in part on the frequency of requests or the predicted frequency of request. The management service 304 may then split the prefix by at least incrementing the prefix length by one element of the key space as described above and updating the key value store maintained by the request-processing subsystem 302. The management subsystem 304 may then cause a new partition to be created on a data storage server 308 and once the new partition has been created the repair service 310 may then copy data associated with the new prefix to the newly created partition.

Figure 4:
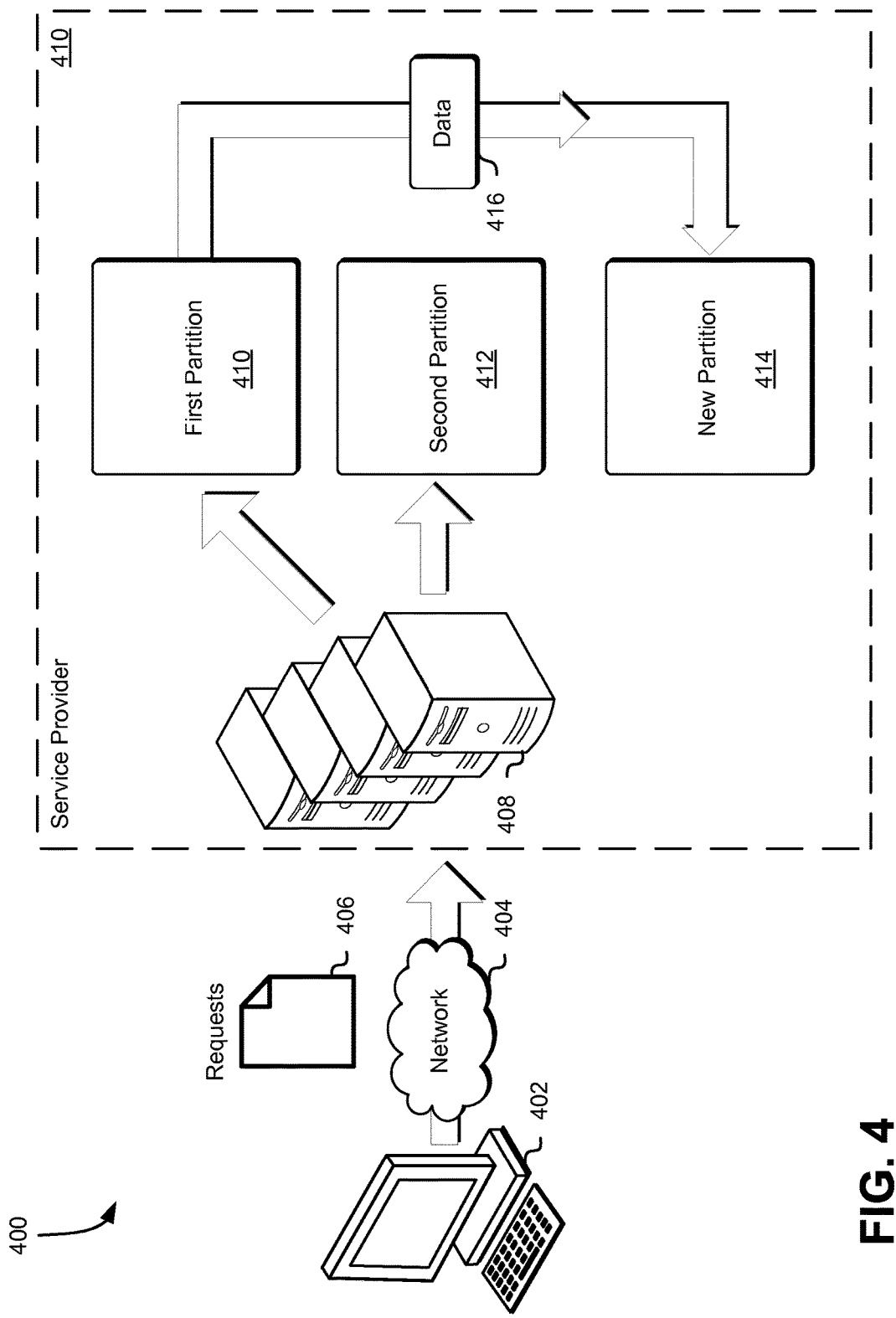
FIG. 4 is an environment illustrating partitioning a new data storage partition in accordance with at least one embodiment.

FIG. 4 illustrates an example environment 400 where one or more computer systems running within a computing resource service provider environment, as well as the associated code running thereon, may generate a new storage partition to process requests for data objects. A user 402 may connect to a data storage server 408 through a computer system client device and may initiate connection with and/or interaction with one or more storage partitions associated with the data storage server 408. The user 402 may transmit request 406 including a key configured to identify the requested data over a network 404 as described above. The service provider 410 may operate a data storage service as described above in connection with FIG. 3. The data storage service may include a management subsystem configured to distribute load between the data storage servers 408 and the partitions by at least causing new partitions 414 to be generated in order to process requests 406 including a particular prefix. The data storage server 408 may execute one or more partitions including a first partition 410, a second partition 412 and a new partition 414. The storage partitions may be a computer system configured to store data associated with a particular key or prefix of a key. Storage partitions are described in greater detail below in connection with FIG. 5.

The management subsystem may periodically or aperiodically request information corresponding to potential split points in the key space from the storage partitions. For example, each partition may track prefixes of keys included in requests 406 directed to the particular partition. The partitions may also determine potential split points based on at least the frequency of the requests including the particular prefix and the amount of data associated with the prefix. For example, if the first partition 410 is tracking prefixes "ABC" and "EFG" and the count for at least one of the prefixes tracked by the first partition is above a certain threshold, the first partition 410 may determine to split the prefix "EFG" because the amount of data associated with prefix "EFG" is less than the amount of data associated with "ABC" and it may be more efficient to move the smaller amount of data to the new partition 414. In various embodiments, the storage partitions provide tracking information to the management subsystem and the management subsystem determines potential split points in the key space.

Once a split point is determined and the service provider 410 or component thereof determines to split the prefix, the new partition 414 may be created. The repair service may then transfer data 416 associated with the new prefix from the storage partition previously responsible for maintaining the data. For example, as illustrated in FIG. 4, the determination to split the first partition 410 may cause the repair service to copy data 416 from the first partition 410 to the new partition 414. The first partition 410 may continue to fulfill request 406 until the repair process has completed operations. In various embodiments, the first partition 414 contains multiple data stores with at least some redundant information, the repair service then copies only the most recent data to the new partition 414 based at least in part on a time stamp corresponding to the data. Once the repair service has copied the information associated with the prefix to be split from the first partition 410 to the new partition 414, the repair service or other component of the service provider 410 may update the request-processing system such that the record contained in the key value store for the split prefix points to the new partition 414 so that requests including the newly split prefix may be directed to the new partition 414.

Figure 5:
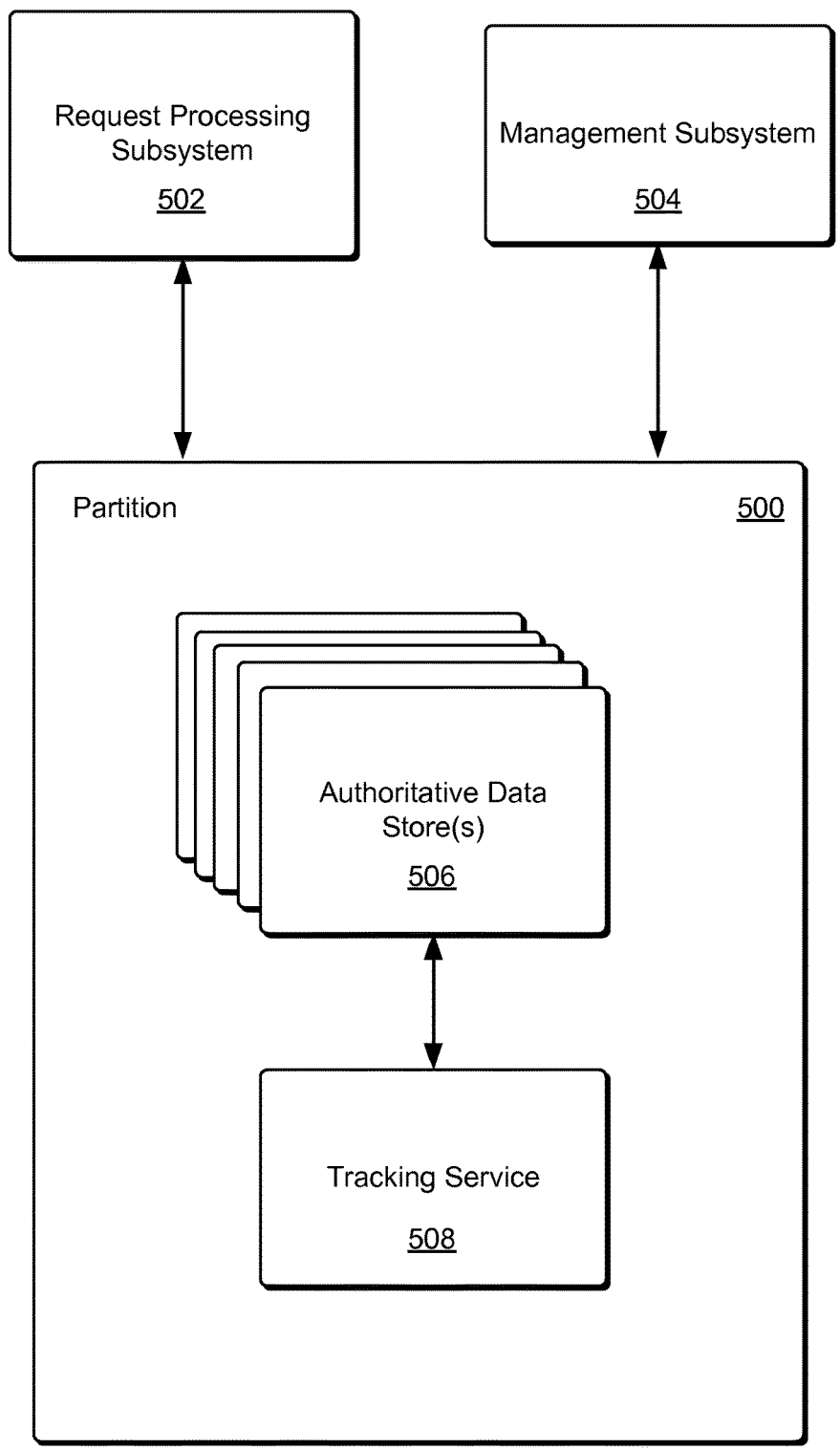
FIG. 5 is a diagram illustrating a data storage partition in accordance with at least one embodiment.

FIG. 5 shows an illustrative example of a storage partition 500 in accordance with various embodiments. The partition 500 may be a component of or executed by the data storage servers of the data storage service as described above in connection to FIG. 3. As illustrated in FIG. 5, the partitions 500 may include a tracking service 508 and one or more authoritative data stores 506. Furthermore, the partition may be connected over a network to the request-processing subsystem 502 and the management subsystem 504 of the data storage service. The partition 500 may be a computer system configured to receive requests to store data and/or read stored data. For example, the partition 500 may be a virtual computer system executing one or more applications, which collectively are capable of reading and writing data from the one or more authoritative data stores 506. The authoritative data stores 506 may be a data storage system configured to store data in a logical container such as a logical volume. For example, the authoritative data stores 506 may be logical volumes corresponding to at least a portion of a physical hard drive of the data storage server executing the partition 500 and exposed to the partition 500 such that the partition may write and read data from the logical volume.

The partition 500 may also include a tracking service 508. The tracking service 508 may be a process or application of the partition 500 configured to track the frequency of prefixes included in requests to interact with data stored by the partitions. The request-processing subsystem 502 may direct requests to the partition 500 based at least in part on the key included in the request and the key value store indication the particular partition 500 indicated by the key. The tracking service 508 may track a certain number of prefixes associated with the partition 500. For example, the partition 500 may be responsible for data associated with twenty million keys and the tracking service 508 may track one thousand of the most frequently received prefixes. For each request received from the request-processing subsystem 502, the partition 500 may cause the authoritative data store 506 to fulfill the request and the tracking service 508 may increment a counter associated with the prefix included in the request as described above in connection with FIG. 2. The tracking service 508 may also transmit information to the management subsystem 504. For example, the tracking service 508 may transmit an indication to the management service 504 of one or more points in the key space where the key could be split in order to generate additional prefixes.

Figure 6:
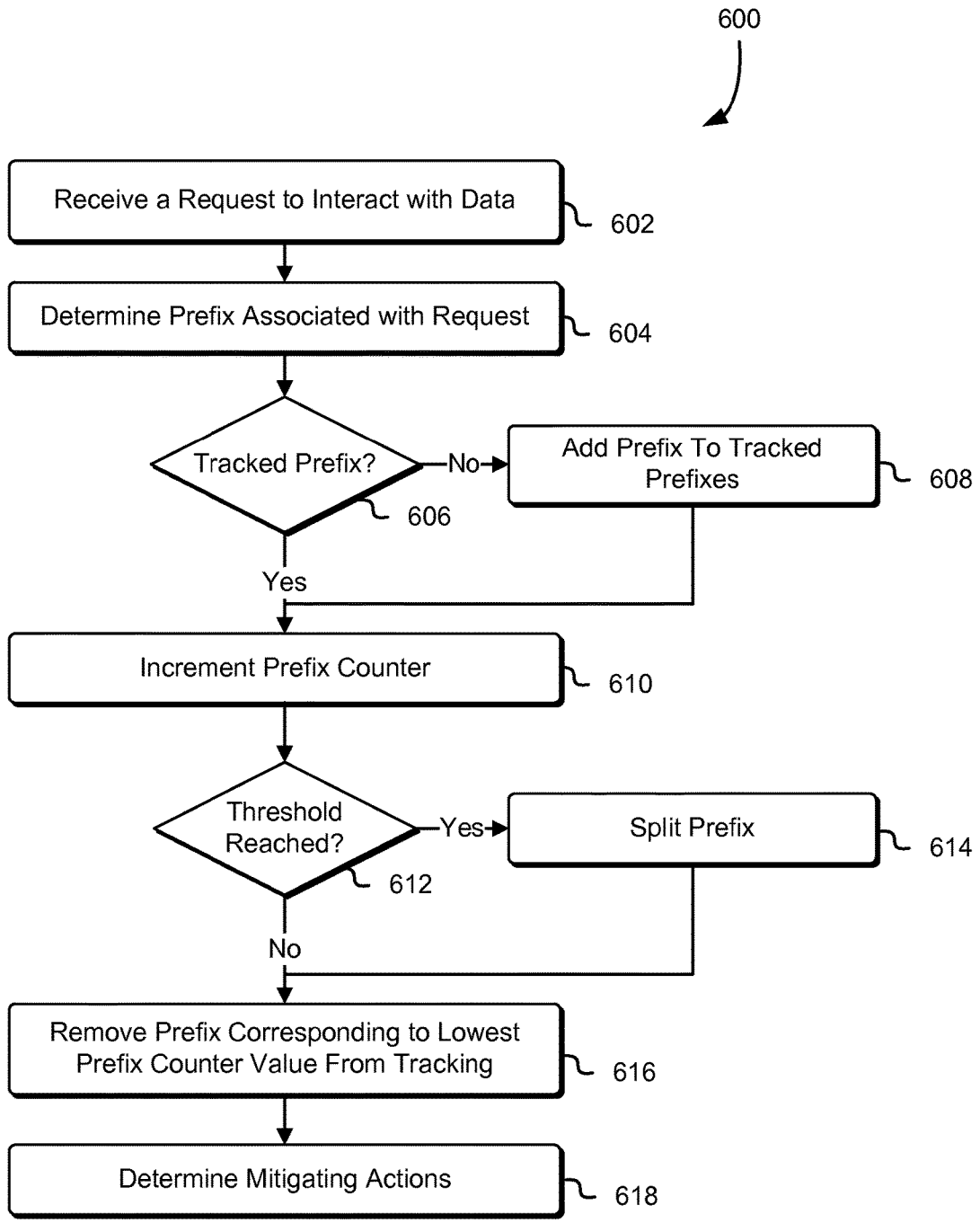
FIG. 6 is a process illustrating tracking key prefixes in accordance with at least one embodiment.

FIG. 6 shows an illustrative example of a process 600 which may be used to track prefixes of keys indicating the location of data in a data storage service and determining split points in the prefixes in order to take mitigating actions. The process 600 may be performed by any suitable system, such as by the data storage service as described in connection with FIG. 3. Returning to FIG. 6, in an embodiment, the process 600 includes receiving a request to interact with data 602. The request may be a request described above or may include a request suitable for enabling a user to interact with data stored remotely with a service provider. The request may include a key or a portion of a key indicating the location of the data. The request may be received at the request-processing subsystem of the data storage service and the request-processing subsystem may determine a prefix associated with the request 604. The prefix may indicate a partition and a storage server indicated by the key as the location of the data. The request-processing system may then direct the request to the particular partition indicated by the prefix included in the request.

Once received by the partition, the tracking service may determine if the prefix is currently being tracked 606. Prefixes may be tracked in memory of the partition as a collection or order list. The tracking service may track a certain number of prefixes; if the maximum number of tracked prefixes is reached, the tracking service may temporarily track received prefixes that are not already part of the collection of tracked prefixes in order to determine if the received prefixes are included in requests at a higher frequency than one or more of the tracked prefixes currently included in the collection of tracked prefixes. For example, if the prefix is not in the collection of tracked prefixes, the tracking service may add it to the collection of tracked prefixes 608. The tracking service may then increment a prefix counter associated with the prefix 610. However, if the prefix is already included in the collection of tracked prefixes, the tracking service may simply increment the prefix counter 610. Furthermore, the prefix counter may be configured to decay over time such as by using an exponential decay curve as described above.

Once the prefix counter has been incremented 610, the tracking service or some other service of the computer system of the service provider, such as the management subsystem, may determine if a threshold has been reached 612. The threshold may correspond to a request frequency that requires the prefix to be split in order to improve the request-processing capacity of the data storage service. For example, the threshold may be a particular value of the prefix counter that, if reached, may cause the management subsystem to generate (or cause to be generated) an additional partition associated with a new prefix. If the threshold is reached, the prefix may then be split 614. Splitting the prefix may include incrementing the prefix length to include additional key space elements that may be used to indicate the location of the new partition associated with the split prefix. The tracking service may then remove the prefix corresponding to the lowest counter value 616 from the collection of tracked prefixes.

The tracking service may only remove prefixes from the collection of track prefixes if there are one or more other prefixes with a higher prefix counter. For example, the tracking service may temporarily track prefixes not included in the collection of track prefixes as described above, if the prefix counter corresponding to the temporarily tracked prefixes exceeds at least one of the prefix counters corresponding to tracked prefixes, the tracking service may replace one of the tracked prefixes with the temporarily tracked prefix. Prefixes may also be removed from the collection of tracked prefixes if the prefix counter decays to a certain value. For example, if the prefix counter decays to zero, the tracking service may remove the prefix from the collection of tracked prefixes. The data storage service or a component of the data storage service, such as the management subsystem, may then determine one or more mitigating actions 618 to take in response to the prefix counter reaching the threshold. Mitigating actions may include generating a new partition for processing requests associated with the new split prefixes, throttling or otherwise limiting the number of requests that may be submitted, including the prefix, redirecting traffic to a redundant data storage service for request processing or another action suitable for mitigating the load generated by request frequency.

Figure 7:
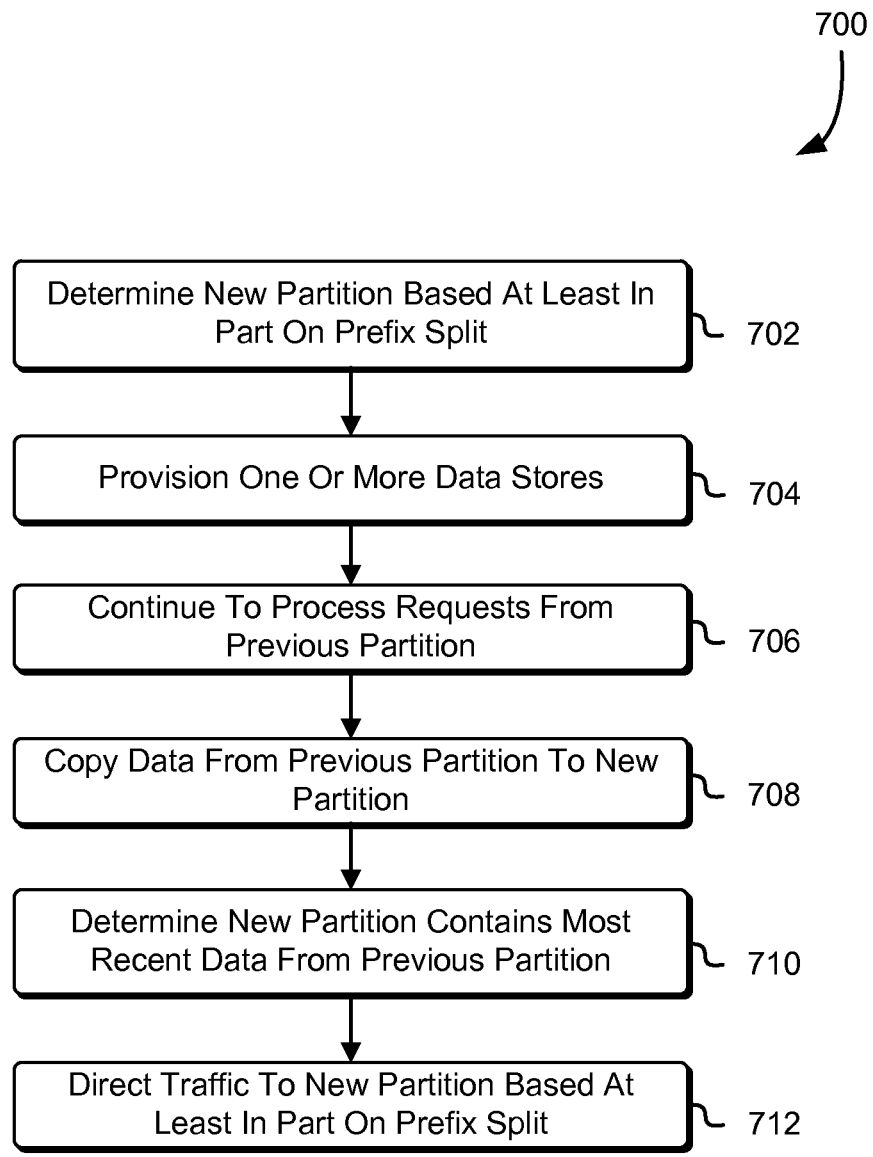
FIG. 7 is a process illustrating partitioning a new data storage partition in accordance with at least one embodiment.

FIG. 7 shows an illustrative example of a process 700 which may be used to generate a new partition. The process 700 may be performed by any suitable system, such as by the data storage service as described in connection with FIG. 3. Returning to FIG. 7, in an embodiment, the process 700 includes determining a new partition based at least in part on a prefix split 702. For example, the management subsystem may determine to split a particular prefix based at least in part on the counter corresponding to the prefix reaching a certain value. The management subsystem may then cause a data storage server to generate a new partition. The data storage service may then provision one or more data stores 704 to be used by the new partition to store data. The one or more data stores may be configured to operate on a quorum basis as described above. The data storage service may then continue to process requests from the previous partition 706 indicated by the split prefix. For example, the split prefix may be generated from the prefix "ABC" to include "ABCD" and the split prefix "ABCD" may be associated with the new partition; however, the request-processing subsystem may continue to direct requests including the split prefix "ABCD" to the previous partition to which prefix "ABC" is directed.

The repair service may then begin copying data from the previous partition to the new partition 708. The repair service may determine the most recent data contained in the one or more data stores of the previous partition based at least in part on a time stamp or other information associated with the data such as a sequence number or version number. The repair service may then copy the most recent data from the previous partition to the new partition. The repair service or other component of the data storage service may then determine that the new partition contains the most recent data from the previous partition 710. In various embodiments, the repair service may indicate when sufficient data has been copied to the new partition to begin processing requests and may continue to copy data from the previous partition to the new partition while the new partition is processing requests. Once it is determined that the new partition may process requests, the request-processing subsystem may update the key value store such that traffic may be directed to the new partition based at least in part on the prefix split 712.

Figure 8:
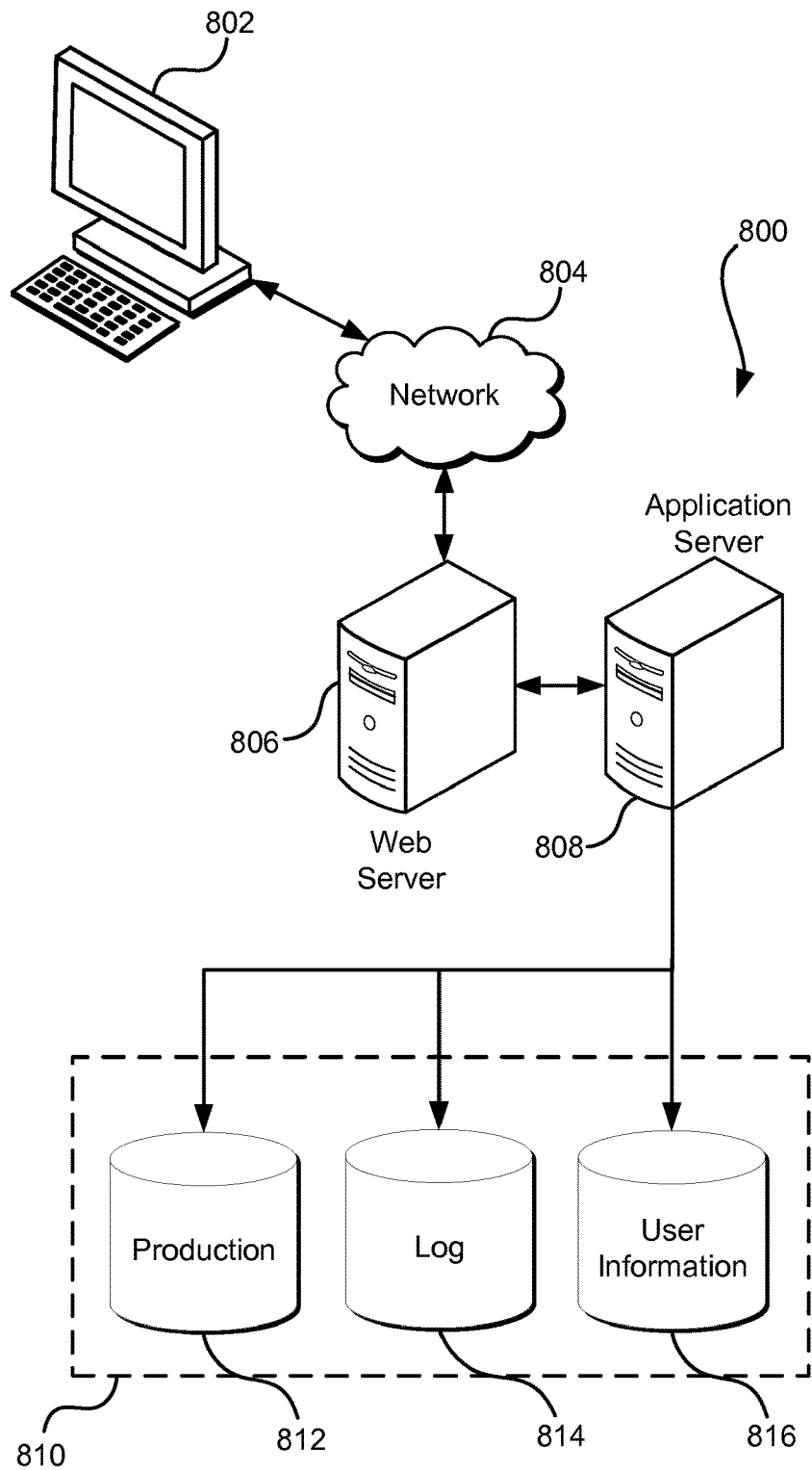
FIG. 8 illustrates an environment in which various embodiments can be implemented.

FIG. 8 illustrates aspects of an example environment 800 for implementing aspects in accordance with various embodiments. As will be appreciated, although a web-based environment is used for purposes of explanation, different environments may be used, as appropriate, to implement various embodiments. The environment includes an electronic client device 802, which can include any appropriate device operable to send and/or receive requests, messages or information over an appropriate network 804 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 802 and the application server 808, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 810 can include several separate data tables, databases, data documents, dynamic data storage schemes and/or other data storage mechanisms and media for storing data relating to a particular aspect of the present disclosure. For example, the data store illustrated may include mechanisms for storing production data 812 and user information 816, which can be used to serve content for the production side. The data store also is shown to include a mechanism for storing log data 814, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. The application server 808 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 802. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A computer-implemented method, comprising:
    tracking a first prefix associated with a first key and a second key, the first prefix containing at least a first portion of the first key and the second key, the first and second keys having a respective variable size and being members of a key set;
    updating a first prefix counter associated with the first prefix responsive to a request associated with the first key, wherein the first prefix counter is updated such that a previous state of the first prefix counter has an effect on an updated state of the first prefix counter that decreases as a result of a passage of time between updating to the previous state of the first prefix counter and updating to the updated state of the prefix counter;
    responsive to the first prefix counter being above the threshold value, generating a new partition associated with a new prefix based at least in part on the first prefix, the new prefix containing at least a second portion of the second key and distinct from the first prefix;
    copying data associated with the second key to the new partition based at least in part on generating the new prefix; and
    enabling access to the new partition by associating a data location with the new prefix based at least in part on the first prefix counter being above the threshold value, the data location enabling access to the copied data associated with the second key.

2. The computer-implemented method of claim 1, wherein the computer implemented method further includes tracking a collection of prefixes of a key-value store by at least:
    determining a particular prefix is not included in the collection of prefixes;
    incrementing a particular prefix counter corresponding to the particular prefix and tracking the particular prefix for an interval;
    determining a first frequency of requests associated with the particular prefix is greater than a second frequency of requests associated with at least on other prefix included in the collection of prefixes based at least in part on the particular prefix counter; and
    replacing the at least one other prefix with the particular prefix in the collection of prefixes.

3. The computer-implemented method of claim 2, wherein the computer implemented method further includes removing one or more other prefixes from the collection of prefixes based at least in part on one or more other counters corresponding to the one or more other prefixes decaying to a certain value.

4. The computer-implemented method of claim 1, wherein the threshold value is relative to a counter associated with a second prefix.

5. A system, comprising:
    one or more processors; and
    memory with instructions that, as a result of being executed by the one or more processors, cause the system to:
        for a request to access a data object identified by an identifier, determine a subsequence of the identifier associated with a partition in which the data object is stored, the partition tracks a maximum number of subsequences;
        increment a counter corresponding to the subsequence, the counter maintained by the partition; and
        perform one or more mitigating actions as a result of the counter reaching a threshold value, the one or more mitigating actions includes generating a new subsequence associated with a generated second partition such that the generated second partition fulfills requests for the new subsequence.

6. The system of claim 5, wherein the memory further includes instructions that, as a result of being executed by the one or more processors, cause the system to remove the subsequence from the maximum number of subsequences tracked by the partition as a result of the counter decaying to a certain value.

7. The system of claim 5, wherein the instructions that cause the system to perform the one or more mitigating actions further include instructions that cause the system to reduce a number of requests that may be submitted including the subsequence.

8. The system of claim 5, wherein the instructions that cause the system to perform the one or more mitigating actions further include instructions that cause the system to:
    copy data associated with the new subsequence from the partition to the generated second partition; and
    enable the generated second partition to process requests including the new subsequence.

9. The system of claim 8, wherein the instructions that cause the system to perform the one or more mitigating actions further include instructions that cause the system to predict the new subsequence based at least in part on the maximum number of subsequences tracked by the partition.

10. The system of claim 8, wherein the instructions that cause the system to perform the one or more mitigating actions further include instructions that cause the system to determine the new subsequence based at least in part on an amount of data associated with one or more subsequences of the maximum number of subsequences tracked by the partition.

11. The system of claim 5, the memory further includes instructions that, as a result of being executed by the one or more processors, cause the system to remove a particular subsequence from the maximum number of subsequences tracked by the partition based at least in part on the counter corresponding to the subsequences being greater than a particular counter corresponding to the particular subsequence and adding the subsequence to the maximum number of subsequences tracked.

12. The system of claim 5, wherein the identifier includes a key of variable size.

13. A non-transitory computer-readable storage medium having stored thereon executable instructions that, as a result of being executed by one or more processors of a computer system, cause the computer system to at least:

obtain a subsequence from a request including a key capable of locating data in the computer system and varying in size, the subsequence contains at least a subset of a bit of the key;

increment a subsequence counter corresponding to the subsequence;

determine the subsequence counter is equal to or exceeds a threshold value; and perform one or more actions based on the subsequence counter being equal to or exceeding the threshold value such that processing of requests including the subsequence is distributed between one or more resources of the computer system, the one or more actions includes generating a second subsequence for a generated storage partition based at least in part on the subsequence.

14. The non-transitory computer-readable storage medium of claim 13, wherein the instructions further comprise instructions that, as a result of being executed by the one or more processors, cause the computer system to maintain a maximum size set of subsequences and corresponding counters, where the subsequences and the subsequence counter are members of the set.

15. The non-transitory computer-readable storage medium of claim 13, wherein the instructions that cause the computer system to obtain the subsequence from the request further include instructions that cause the computer system to obtain the subsequence based at least in part on the key where the key includes a reference to information indicating a location of data.

16. The non-transitory computer-readable storage medium of claim 13, wherein the instructions that cause the computer system to perform one or more actions further include instructions that cause the computer system to:

use the generated storage partition of the computer system to process requests including the second subsequence.

17. The non-transitory computer-readable storage medium of claim 16, wherein the instructions that cause the computer system to generate the storage partition further include instructions that cause the computer system to, where two or more copies of a data object are contained in the computer system, copy the more recent data object to the generated storage partition based at least in part on a time stamp associated with the two or more copies of the data object.

18. The non-transitory computer-readable storage medium of claim 16, wherein the instructions that cause the computer system to generate the second subsequence further include instructions that cause the computer system to remove the subsequence from a set of subsequences tracked by the computer system.

19. The non-transitory computer-readable storage medium of claim 13, wherein the instructions that cause the computer system to perform one or more actions further include instructions that cause the computer system to predict one or more split points for the subsequence based at least in part on a machine learning algorithm.

20. The non-transitory computer-readable storage medium of claim 13, wherein the instructions that cause the computer system to obtain the subsequence from the request further include instructions that cause the computer system to obtain the subsequence based at least in part on the key where the key is defined by a user.

\* \* \* \* \*